United States Patent
Srivastava et al.

(10) Patent No.: US 10,246,558 B2
(45) Date of Patent: Apr. 2, 2019

(54) COMPOSITIONS COMPRISING SILOXANE COMPOUNDS AND METHODS FOR USING THE SAME

(71) Applicant: Milliken & Company, Spartanburg, SC (US)

(72) Inventors: Sudhanshu Srivastava, Greer, SC (US); Sasha Stankovich, Spartanburg, SC (US); Michael E. Wilson, Middleburg, FL (US); Robbie W. J. Hanssen, Boiling Springs, SC (US); Eduardo Torres, Greer, SC (US); Cliferson Thivierge, Gainesville, FL (US); Russell A. Stapleton, Spartanburg, SC (US); Eric B. Monroe, Gaithersburg, MD (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 15/596,681

(22) Filed: May 16, 2017

(65) Prior Publication Data

US 2017/0335065 A1    Nov. 23, 2017

Related U.S. Application Data

(60) Provisional application No. 62/339,771, filed on May 20, 2016.

(51) Int. Cl.

| | |
|---|---|
| C08G 77/08 | (2006.01) |
| C08G 77/06 | (2006.01) |
| C08L 83/04 | (2006.01) |
| C08G 77/04 | (2006.01) |
| C08K 5/098 | (2006.01) |
| C08K 5/19 | (2006.01) |
| C08L 83/00 | (2006.01) |

(52) U.S. Cl.
CPC ............ *C08G 77/06* (2013.01); *C08G 77/04* (2013.01); *C08G 77/08* (2013.01); *C08K 5/098* (2013.01); *C08K 5/19* (2013.01); *C08L 83/00* (2013.01); *C08L 83/04* (2013.01); *C08G 77/045* (2013.01)

(58) Field of Classification Search
CPC ......... C08G 77/04; C08G 77/06; C08G 77/08
See application file for complete search history.

(56) References Cited

U.S. PATENT DOCUMENTS

| | | | | |
|---|---|---|---|---|
| 3,294,717 A * | 12/1966 | Krantz | .................. | C08G 77/06 528/18 |
| 4,513,132 A * | 4/1985 | Shoji | ..................... | C08G 77/52 524/477 |
| 4,704,443 A * | 11/1987 | Lamont | .................. | C08G 77/34 528/18 |
| 5,298,589 A * | 3/1994 | Buese | ...................... | C07F 7/21 525/477 |
| 5,731,260 A * | 3/1998 | Abell | ....................... | B01J 20/20 165/104.12 |
| 6,114,429 A * | 9/2000 | Yamada | ................. | C08L 83/04 252/512 |
| 6,294,634 B1 * | 9/2001 | Ferritto | ................. | A61K 8/585 528/12 |
| 2002/0018885 A1 * | 2/2002 | Takahashi | ............ | C10M 169/00 428/328 |
| 2010/0041851 A1 * | 2/2010 | Katsoulis | ............... | C08G 77/58 528/9 |
| 2014/0306259 A1 * | 10/2014 | Liu | ........................ | H01L 33/56 257/99 |
| 2014/0309448 A1 | 10/2014 | Liu et al. | | |
| 2014/0309450 A1 | 10/2014 | Liu | | |
| 2015/0197599 A1 * | 7/2015 | Wiss | .................... | C08G 63/685 528/327 |

OTHER PUBLICATIONS

PCT/US2017/032889 International Search Report, filed May 16, 2017, 4 pages.
PCT/US2017/032889 Written Opinion of the International Searching Authority, filed May 16, 2017, 7 pages.

* cited by examiner

*Primary Examiner* — Margaret G Moore
(74) *Attorney, Agent, or Firm* — Robert M. Lanning

(57) ABSTRACT

A composition comprises a first siloxane compound comprising at least one cyclic siloxane moiety and a first salt, the first salt comprising a conjugate base of a volatile organic acid. A method for producing a cross-linked siloxane network comprises the steps of providing a first siloxane compound comprising at least one cyclic siloxane moiety, providing a first salt comprising a conjugate base of a volatile organic acid, combining the first siloxane compound and the first salt to produce a reaction mixture, heating the reaction mixture to a temperature sufficient for the first salt to open the ring of the cyclic siloxane moiety, and maintaining the reaction mixture at an elevated temperature so that at least a portion of the opened cyclic siloxane moieties react with each other to produce a cross-linked siloxane network.

26 Claims, No Drawings

COMPOSITIONS COMPRISING SILOXANE COMPOUNDS AND METHODS FOR USING THE SAME

CROSS-REFERENCE TO RELATED APPLICATIONS

This application claims, pursuant to 35 U.S.C. § 119(e), priority to and—the benefit of the filing date of U.S. Patent Application No. 62/339,771, which was filed on May 20, 2016.

TECHNICAL FIELD OF THE INVENTION

This application is directed to compositions comprising siloxane compounds and methods for using such compositions to produce cross-linked siloxane networks, such as those found in silicone elastomers.

BACKGROUND

Siloxane compounds and silicones have found many uses in modern industry. For example, siloxane compounds are widely used in the production of cross-linked silicone polymers. These polymers typically are produced by either a hydrosilylation reaction or a condensation reaction. In the hydrosilylation reaction, siloxane compounds bearing vinyl groups undergo addition to link individual molecules of the compounds through the formation of new Si—C bonds. The hydrosilylation reaction typically is catalyzed by platinum, which contributes to the cost of these polymers since the platinum cannot be recovered from the cured elastomer. In the condensation reaction, the siloxane compounds react in a condensation reaction to form new Si—O—Si linkages between individual molecules. This condensation reaction produces volatile organic compounds (VOCs) as a by-product.

An alternative method for producing cross-linked silicone polymers utilizes starting materials containing cyclic siloxane moieties. In the polymerization reaction, these starting materials are combined with a suitable base. The base attacks and breaks some of the siloxane linkages present in the cyclic siloxane moieties. When these siloxane linkages are broken, the two ends of the broken siloxane linkage are converted to silanolate ions. These silanolate ions then react with other silanolate ions and/or siloxane linkages (e.g., siloxane linkages in the cyclic siloxane moieties present on other molecules of the starting materials) to produce new siloxane linkages and cross-links between the different molecules of the starting materials. The product of this reaction is a cross-linked silicone polymer. Typically, a strong base is employed to ensure that the polymerization reaction proceeds quickly and to the desired degree. However, in an industrial setting, it is often necessary to combine the various components in a large batch to ensure thorough mixing and to provide material that is ready for use when needed. In such situations, utilizing a strong base significantly reduces the "pot life" or "working time" of the composition once the components are combined.

A need therefore remains for compositions and methods that are capable of producing high quality cross-linked siloxane networks (e.g., cross-linked silicone polymers) under the desired conditions and yet exhibit a pot life or working time that is sufficiently long to facilitate their use in industrial settings. The compositions and methods described herein seek to address this unmet need.

BRIEF SUMMARY OF THE INVENTION

In a first embodiment, the invention provides a composition comprising:
(a) a first siloxane compound, the first siloxane compound comprising at least one cyclic siloxane moiety; and
(b) a first salt, the first salt comprising a conjugate base of a volatile organic acid.

In a second embodiment, the invention provides a method for producing a cross-linked siloxane network comprising the steps of:
(a) providing a first siloxane compound, the first siloxane compound comprising at least one cyclic siloxane moiety;
(b) providing a first salt, the first salt comprising a conjugate base of a volatile organic acid;
(c) combining the first siloxane compound and the first salt to produce a reaction mixture;
(d) heating the reaction mixture to a temperature sufficient for the first salt to open the ring of the cyclic siloxane moiety; and
(e) maintaining the reaction mixture at an elevated temperature so that at least a portion of the opened cyclic siloxane moieties react with each other to produce a cross-linked siloxane network.

DETAILED DESCRIPTION OF THE INVENTION

The following definitions are provided to define several of the terms used throughout this application.

As used herein, the term "substituted alkyl groups" refers to univalent functional groups derived from substituted alkanes by removal of a hydrogen atom from a carbon atom of the alkane. In this definition, the term "substituted alkanes" refers to compounds derived from acyclic unbranched and branched hydrocarbons in which (1) one or more of the hydrogen atoms of the hydrocarbon is replaced with a non-hydrogen atom (e.g., a halogen atom) or a non-alkyl functional group (e.g., hydroxy group, aryl group, heteroaryl group) and/or (2) the carbon-carbon chain of the hydrocarbon is interrupted by an oxygen atom (as in an ether), a nitrogen atom (as in an amine), or a sulfur atom (as in a sulfide).

As used herein, the term "substituted cycloalkyl groups" refers to univalent functional groups derived from substituted cycloalkanes by removal of a hydrogen atom from a carbon atom of the cycloalkane. In this definition, the term "substituted cycloalkanes" refers to compounds derived from saturated monocyclic and polycyclic hydrocarbons (with or without side chains) in which (1) one or more of the hydrogen atoms of the hydrocarbon is replaced with a non-hydrogen atom (e.g., a halogen atom) or a non-alkyl functional group (e.g., hydroxy group, aryl group, heteroaryl group) and/or (2) the carbon-carbon chain of the hydrocarbon is interrupted by an oxygen atom, a nitrogen atom, or a sulfur atom.

As used herein, the term "alkenyl groups" refers to univalent functional groups derived from acyclic, unbranched and branched olefins (i.e., hydrocarbons having one or more carbon-carbon double bonds) by removal of a hydrogen atom from a carbon atom of the olefin.

As used herein, the term "substituted alkenyl groups" refers to univalent functional groups derived from acyclic, substituted olefins by removal of a hydrogen atom from a carbon atom of the olefin. In this definition, the term "substituted olefins" refers to compounds derived from acyclic, unbranched and branched hydrocarbons having one or more carbon-carbon double bonds in which (1) one or more of the hydrogen atoms of the hydrocarbon is replaced with a non-hydrogen atom (e.g., a halogen atom) or a non-alkyl functional group (e.g., hydroxy group, aryl group, heteroaryl group) and/or (2) the carbon-carbon chain of the hydrocarbon is interrupted by an oxygen atom (as in an ether), a nitrogen atom (as in an amine), or a sulfur atom (as in a sulfide).

As used herein, the term "cycloalkenyl groups" refers to univalent functional groups derived from cyclic olefins (i.e., non-aromatic, monocyclic and polycyclic hydrocarbons having one or more carbon-carbon double bonds) by removal of a hydrogen atom from a carbon atom of the olefin. The carbon atoms in the cyclic olefins can be substituted with alkyl groups and/or alkenyl groups.

As used herein, the term "substituted cycloalkenyl groups" refers to univalent functional groups derived from substituted cyclic olefins by removal of a hydrogen atom from a carbon atom of the cyclic olefin. In this definition, the term "substituted cyclic olefins" refers to compounds derived from non-aromatic, monocyclic and polycyclic hydrocarbons having one or more carbon-carbon double bonds in which one or more of the hydrogen atoms of the hydrocarbon is replaced with a non-hydrogen atom (e.g., a halogen atom) or a non-alkyl functional group (e.g., hydroxy group, aryl group, heteroaryl group).

As used herein, the term "heterocyclyl groups" refers to univalent functional groups derived from heterocyclic compounds by removal of a hydrogen atom from an atom in the cyclic portion of the heterocyclic compound. In this definition, the term "heterocyclic compounds" refers to compounds derived from non-aromatic, monocyclic and polycyclic compounds having a ring structure composed of atoms of at least two different elements. These heterocyclic compounds can also comprise one or more double bonds.

As used herein, the term "substituted heterocyclyl groups" refers to univalent functional groups derived from substituted heterocyclic compounds by removal of a hydrogen atom from an atom in the cyclic portion of the compound. In this definition, the term "substituted heterocyclic compounds" refers to compounds derived from non-aromatic, monocyclic and polycyclic compounds having a ring structure composed of atoms of at least two different elements where one or more of the hydrogen atoms in the cyclic compound is replaced with a non-hydrogen atom (e.g., a halogen atom) or a functional group (e.g., hydroxy group, alkyl group, aryl group, heteroaryl group). These substituted heterocyclic compounds can also comprise one or more double bonds.

As used herein, the term "substituted aryl groups" refers to univalent functional groups derived from substituted arenes by removal of a hydrogen atom from a ring carbon atom. In this definition, the term "substituted arenes" refers to compounds derived from monocyclic and polycyclic aromatic hydrocarbons in which one or more of the hydrogen atoms of the hydrocarbon is replaced with a non-hydrogen atom (e.g., a halogen atom) or a non-alkyl functional group (e.g., hydroxy group).

As used herein, the term "substituted heteroaryl groups" refers to univalent functional groups derived from substituted heteroarenes by removal of a hydrogen atom from a ring carbon atom. In this definition, the term "substituted heteroarenes" refers to compounds derived from monocyclic and polycyclic aromatic hydrocarbons in which (1) one or more of the hydrogen atoms of the hydrocarbon is replaced with a non-hydrogen atom (e.g., a halogen atom) or a non-alkyl functional group (e.g., hydroxy group) and (2) at least one methine group (—C=) of the hydrocarbon is replaced by a trivalent heteroatom and/or at least one vinylidene group (—CH=CH—) of the hydrocarbon is replaced by a divalent heteroatom.

As used herein, the term "alkanediyl groups" refers to divalent functional groups derived from alkanes by removal of two hydrogen atoms from the alkane. These hydrogen atoms can be removed from the same carbon atom on the alkane (as in ethane-1,1-diyl) or from different carbon atoms (as in ethane-1,2-diyl).

As used herein, the term "substituted alkanediyl groups" refers to divalent functional groups derived from substituted alkanes by removal of two hydrogen atoms from the alkane. These hydrogen atoms can be removed from the same carbon atom on the substituted alkane (as in 2-fluoroethane-1,1-diyl) or from different carbon atoms (as in 1-fluoroethane-1,2-diyl). In this definition, the term "substituted alkanes" has the same meaning as set forth above in the definition of substituted alkyl groups.

As used herein, the term "alkenediyl groups" refers to divalent functional groups derived from acyclic, unbranched and branched olefins (i.e., hydrocarbons having one or more carbon-carbon double bonds) by removal of two hydrogen atoms from the olefin. These hydrogen atoms can be removed from the same carbon atom on the olefin (as in but-2-ene-1,1-diyl) or from different carbon atoms (as in but-2-ene-1,4-diyl).

As used herein, the term "acyl groups" refers to univalent functional groups derived from alkyl carboxylic acids by removal of a hydroxy group from a carboxylic acid group. In this definition, the term "alkyl carboxylic acids" refers to acyclic, unbranched and branched hydrocarbons having one or more carboxylic acid groups.

As used herein, the term "substituted acyl groups" refers to univalent functional groups derived from substituted alkyl carboxylic acids by removal of a hydroxy group from a carboxylic acid group. In this definition, the term "substituted alkyl carboxylic acids" refers to compounds having one or more carboxylic acid groups bonded to a substituted alkane, and the term "substituted alkane" is defined as it is above in the definition of substituted alkyl groups.

As used herein, the term "siloxy groups" refers to univalent functional groups having the structure —[OSiR$_x$R$_y$]$_g$R$_z$, where R$_x$, R$_y$, and R$_z$ are independently selected from the group consisting of alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, aryl groups, substituted aryl groups, heteroaryl groups, substituted heteroaryl groups and the variable g is an integer equal to or greater than 1. In a preferred embodiment, R$_x$, R$_y$, and R$_z$ are independently selected from the group consisting of alkyl groups (e.g., C$_1$-C$_8$ alkyl groups), and the variable g is an integer from 1 to 50, more preferably 1 to 20.

In a first embodiment, the invention provides a composition comprising a first siloxane compound and a first salt. The first siloxane compound present in the composition can be any suitable siloxane compound. The first siloxane compound can be siloxane oligomer or siloxane polymer. The first siloxane compound preferably comprises at least one cyclic siloxane moiety. More preferably, the first siloxane compound comprises at least two (two or more) cyclic siloxane moieties.

In a preferred embodiment, the composition comprises a siloxane compound selected from the group consisting of compounds conforming to the structure of Formula (X) below

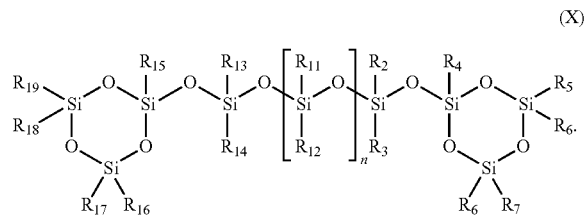

(X)

In the structure of Formula (X), $R_2$, $R_3$, $R_4$, $R_5$, $R_6$, $R_7$, $R_8$, $R_{11}$, $R_{12}$, $R_{13}$, $R_{14}$, $R_{15}$, $R_{16}$, $R_{17}$, $R_{18}$, and $R_{19}$ are independently selected from the group consisting of alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, aryl groups, substituted aryl groups, heteroaryl groups, substituted heteroaryl groups, and siloxy groups. At least one of $R_7$ and $R_8$ is different from each of $R_2$, $R_3$, $R_4$, $R_5$, and $R_6$, and at least one of $R_{16}$ and $R_{17}$ is different from each of $R_{13}$, $R_{14}$, $R_{15}$, $R_{18}$, and $R_{19}$. The variable n is selected from the group consisting of integers equal to or greater than 1.

In a preferred embodiment, $R_2$, $R_3$, $R_4$, $R_5$, $R_6$, $R_{13}$, $R_{14}$, $R_{15}$, $R_{18}$, and $R_{19}$ are independently selected from the group consisting of alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, and siloxy groups. More preferably, $R_2$, $R_3$, $R_4$, $R_5$, $R_6$, $R_{13}$, $R_{14}$, $R_{15}$, $R_{18}$, and $R_{19}$ are independently selected from the group consisting of alkyl groups and substituted alkyl groups, with $C_1$-$C_8$ alkyl groups and $C_1$-$C_8$ substituted alkyl groups being particularly preferred. More preferably, $R_2$, $R_3$, $R_4$, $R_5$, $R_6$, $R_{13}$, $R_{14}$, $R_{15}$, $R_{18}$, and $R_{19}$ are independently selected from the group consisting of alkyl groups, with $C_1$-$C_8$ alkyl groups being particularly preferred. In a particularly preferred embodiment, $R_2$, $R_3$, $R_4$, $R_5$, $R_6$, $R_{13}$, $R_{14}$, $R_{15}$, $R_{18}$, and $R_{19}$ are methyl groups.

In another preferred embodiment, $R_{11}$ and $R_{12}$ are independently selected from the group consisting of haloalkyl groups, aralkyl groups, aryl groups, substituted aryl groups, heteroaryl groups, and substituted heteroaryl groups. More preferably, $R_{11}$ and $R_{12}$ are independently selected from the group consisting of aryl groups, substituted aryl groups, heteroaryl groups, and substituted heteroaryl groups, with $C_6$-$C_{10}$ aryl groups, $C_6$-$C_{12}$ substituted aryl groups, $C_4$-$C_{10}$ heteroaryl groups, and $C_4$-$C_{12}$ substituted heteroaryl groups being particularly preferred. More preferably, $R_{11}$ and $R_{12}$ are independently selected from the group consisting of aryl groups and substituted aryl groups, with $C_6$-$C_{10}$ aryl groups and $C_6$-$C_{12}$ substituted aryl groups being particularly preferred. More preferably, $R_{11}$ and $R_{12}$ are independently selected from the group consisting of aryl groups, with $C_6$-$C_{10}$ aryl groups being particularly preferred. In a particularly preferred embodiment, $R_{11}$ and $R_{12}$ are phenyl groups.

In another preferred embodiment, $R_7$, $R_8$, $R_{16}$, and $R_{17}$ are independently selected from the group consisting of haloalkyl groups, aralkyl groups, aryl groups, substituted aryl groups, heteroaryl groups, and substituted heteroaryl groups. More preferably, $R_7$, $R_8$, $R_{16}$, and $R_{17}$ are independently selected from the group consisting of aryl groups, substituted aryl groups, heteroaryl groups, and substituted heteroaryl groups, with $C_6$-$C_{10}$ aryl groups, $C_6$-$C_{12}$ substituted aryl groups, $C_4$-$C_{10}$ heteroaryl groups, and $C_4$-$C_{12}$ substituted heteroaryl groups being particularly preferred. More preferably, $R_7$, $R_8$, $R_{16}$, and $R_{17}$ are independently selected from the group consisting of aryl groups and substituted aryl groups, with $C_6$-$C_{10}$ aryl groups and $C_6$-$C_{12}$ substituted aryl groups being particularly preferred. More preferably, $R_7$, $R_8$, $R_{16}$, and $R_{17}$ are independently selected from the group consisting of aryl groups, with $C_6$-$C_{10}$ aryl groups being particularly preferred. In a particularly preferred embodiment, $R_7$, $R_8$, $R_{16}$, and $R_{17}$ are phenyl groups.

In a particularly preferred embodiment, $R_2$, $R_3$, $R_4$, $R_5$, $R_6$, $R_{13}$, $R_{14}$, $R_{15}$, $R_{18}$, and $R_{19}$ are independently selected from the group consisting of alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, and siloxy groups, and $R_7$, $R_8$, $R_{11}$, $R_{12}$, $R_{16}$, and $R_{17}$ are independently selected from the group consisting of haloalkyl groups, aralkyl groups, aryl groups, substituted aryl groups, heteroaryl groups, and substituted heteroaryl groups. In a more specific embodiment, $R_2$, $R_3$, $R_4$, $R_5$, $R_6$, $R_{13}$, $R_{14}$, $R_{15}$, $R_{18}$, and $R_{19}$ are independently selected from the group consisting of alkyl groups and substituted alkyl groups, and $R_7$, $R_8$, $R_{11}$, $R_{12}$, $R_{16}$, and $R_{17}$ are independently selected from the group consisting of aryl groups, substituted aryl groups, heteroaryl groups, and substituted heteroaryl groups. In yet another specific preferred embodiment, $R_2$, $R_3$, $R_4$, $R_5$, $R_6$, $R_{13}$, $R_{14}$, $R_{15}$, $R_{18}$, and $R_{19}$ are independently selected from the group consisting of $C_1$-$C_8$ alkyl groups and $C_1$-$C_8$ substituted alkyl groups, and $R_7$, $R_8$, $R_{11}$, $R_{12}$, $R_{16}$, and $R_{17}$ are independently selected from the group consisting of $C_6$-$C_{10}$ aryl groups, $C_6$-$C_{12}$ substituted aryl groups, $C_4$-$C_{10}$ heteroaryl groups, and $C_4$-$C_{12}$ substituted heteroaryl groups. In another specific preferred embodiment, $R_2$, $R_3$, $R_4$, $R_5$, $R_6$, $R_{13}$, $R_{14}$, $R_{15}$, $R_{18}$, and $R_{19}$ are independently selected from the group consisting of alkyl groups, and $R_7$, $R_8$, $R_{11}$, $R_{12}$, $R_{16}$, and $R_{17}$ are independently selected from the group consisting of aryl groups and substituted aryl groups. In another specific preferred embodiment, $R_2$, $R_3$, $R_4$, $R_5$, $R_6$, $R_{13}$, $R_{14}$, $R_{15}$, $R_{18}$, and $R_{19}$ are independently selected from the group consisting of $C_1$-$C_8$ alkyl groups, and $R_7$, $R_8$, $R_{11}$, $R_{12}$, $R_{16}$, and $R_{17}$ are independently selected from the group consisting of $C_6$-$C_{10}$ aryl groups, and $C_6$-$C_{12}$ substituted aryl groups. In another specific preferred embodiment, $R_2$, $R_3$, $R_4$, $R_5$, $R_6$, $R_{13}$, $R_{14}$, $R_{15}$, $R_{18}$, and $R_{19}$ are independently selected from the group consisting of alkyl groups, and $R_7$, $R_8$, $R_{11}$, $R_{12}$, $R_{16}$, and $R_{17}$ are independently selected from the group consisting of aryl groups. In another specific preferred embodiment, $R_2$, $R_3$, $R_4$, $R_5$, $R_6$, $R_{13}$, $R_{14}$, $R_{15}$, $R_{18}$, and $R_{19}$ are independently selected from the group consisting of $C_1$-$C_8$ alkyl groups, and $R_7$, $R_8$, $R_{11}$, $R_{12}$, $R_{16}$, and $R_{17}$ are independently selected from the group consisting of $C_6$-$C_{10}$ aryl groups. In yet another specific preferred embodiment, $R_2$, $R_3$, $R_4$, $R_5$, $R_6$, $R_{13}$, $R_{14}$, $R_{15}$, $R_{18}$, and $R_{19}$ are methyl groups, and $R_7$, $R_8$, $R_{11}$, $R_{12}$, $R_{16}$, and $R_{17}$ are phenyl groups.

In another preferred embodiment, the composition comprises a siloxane compound selected from the group consisting of compounds conforming to the structure of Formula (XX) below

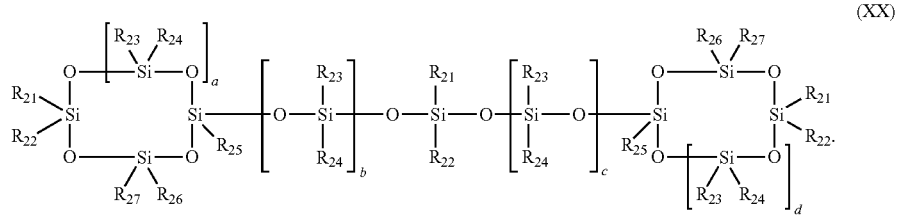

(XX)

In the structure of Formula (XX), the variables a, b, c, and d are integers selected from the group consisting of 0 and 1. The sum of a and b is equal to 1, and the sum of c and d is equal to 1. $R_{21}$, $R_{22}$, $R_{23}$, $R_{24}$, $R_{25}$, $R_{26}$, and $R_{27}$ are independently selected from the group consisting of alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, aryl groups, substituted aryl groups, heteroaryl groups, substituted heteroaryl groups, and siloxy groups. At least one of $R_{21}$ and $R_{22}$ is different from each of $R_{23}$, $R_{24}$, $R_{25}$, $R_{26}$, and $R_{27}$.

In a preferred embodiment, at least one of the variables a and d is 0. More preferably, both variables a and d are 0.

In a preferred embodiment, $R_{23}$, $R_{24}$, $R_{25}$, $R_{26}$, and $R_{27}$ are independently selected from the group consisting of alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, and siloxy groups. More preferably, $R_{23}$, $R_{24}$, $R_{25}$, $R_{26}$, and $R_{27}$ are independently selected from the group consisting of alkyl groups and substituted alkyl groups, with $C_1$-$C_8$ alkyl groups and $C_1$-$C_8$ substituted alkyl groups being particularly preferred. More preferably, $R_{23}$, $R_{24}$, $R_{25}$, $R_{26}$, and $R_{27}$ are independently selected from the group consisting of alkyl groups, with $C_1$-$C_8$ alkyl groups being particularly preferred. In a particularly preferred embodiment, $R_{23}$, $R_{24}$, $R_{25}$, $R_{26}$, and $R_{27}$ are methyl groups.

In another preferred embodiment, $R_{21}$ and $R_{22}$ are independently selected from the group consisting of haloalkyl groups, aralkyl groups, aryl groups, substituted aryl groups, heteroaryl groups, and substituted heteroaryl groups. More preferably, $R_{21}$ and $R_{22}$ are independently selected from the group consisting of aryl groups, substituted aryl groups, heteroaryl groups, and substituted heteroaryl groups, with $C_6$-$C_{10}$ aryl groups, $C_6$-$C_{12}$ substituted aryl groups, $C_4$-$C_{10}$ heteroaryl groups, and $C_4$-$C_{12}$ substituted heteroaryl groups being particularly preferred. More preferably, $R_{21}$ and $R_{22}$ are independently selected from the group consisting of aryl groups and substituted aryl groups, with $C_6$-$C_{10}$ aryl groups and $C_6$-$C_{12}$ substituted aryl groups being particularly preferred. More preferably, $R_{21}$ and $R_{22}$ are independently selected from the group consisting of aryl groups, with $C_6$-$C_{10}$ aryl groups being particularly preferred. In a particularly preferred embodiment, $R_{21}$ and $R_{22}$ are phenyl groups.

In a particularly preferred embodiment, the variables a and d are 0, the variables b and c are 1, $R_{23}$, $R_{24}$, $R_{25}$, $R_{26}$, and $R_{27}$ are independently selected from the group consisting of alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, and siloxy groups, and $R_{21}$ and $R_{22}$ are independently selected from the group consisting of haloalkyl groups, aralkyl groups, aryl groups, substituted aryl groups, heteroaryl groups, and substituted heteroaryl groups. In a more specific embodiment, the variables a and d are 0, the variables b and c are 1, $R_{23}$, $R_{24}$, $R_{25}$, $R_{26}$, and $R_{27}$ are independently selected from the group consisting of alkyl groups and substituted alkyl groups, and $R_{21}$ and $R_{22}$ are independently selected from the group consisting of aryl groups, substituted aryl groups, heteroaryl groups, and substituted heteroaryl groups. In yet another specific preferred embodiment, the variables a and d are 0, the variables b and c are 1, $R_{23}$, $R_{24}$, $R_{25}$, $R_{26}$, and $R_{27}$ are independently selected from the group consisting of $C_1$-$C_8$ alkyl groups and $C_1$-$C_8$ substituted alkyl groups, and $R_{21}$ and $R_{22}$ are independently selected from the group consisting of $C_6$-$C_{10}$ aryl groups, $C_6$-$C_{12}$ substituted aryl groups, $C_4$-$C_{10}$ heteroaryl groups, and $C_4$-$C_{12}$ substituted heteroaryl groups. In another specific preferred embodiment, the variables a and d are 0, the variables b and c are 1, $R_{23}$, $R_{24}$, $R_{25}$, $R_{26}$, and $R_{27}$ are independently selected from the group consisting of alkyl groups, and $R_{21}$ and $R_{22}$ are independently selected from the group consisting of aryl groups and substituted aryl groups. In another specific preferred embodiment, the variables a and d are 0, the variables b and c are 1, $R_{23}$, $R_{24}$, $R_{25}$, $R_{26}$, and $R_{27}$ are independently selected from the group consisting of $C_1$-$C_8$ alkyl groups, and $R_{21}$ and $R_{22}$ are independently selected from the group consisting of $C_6$-$C_{10}$ aryl groups and $C_6$-$C_{12}$ substituted aryl groups. In another specific preferred embodiment, the variables a and d are 0, the variables b and c are 1, $R_{23}$, $R_{24}$, $R_{25}$, $R_{26}$, and $R_{27}$ are independently selected from the group consisting of alkyl groups, and $R_{21}$ and $R_{22}$ are independently selected from the group consisting of aryl groups. In another specific preferred embodiment, the variables a and d are 0, the variables b and c are 1, $R_{23}$, $R_{24}$, $R_{25}$, $R_{26}$, and $R_{27}$ are independently selected from the group consisting of $C_1$-$C_8$ alkyl groups, and $R_{21}$ and $R_{22}$ are independently selected from the group consisting of $C_6$-$C_{10}$ aryl groups. In yet another specific preferred embodiment, the variables a and d are 0, the variables b and c are 1, $R_{23}$, $R_{24}$, $R_{25}$, $R_{26}$, and $R_{27}$ are methyl groups, and $R_{21}$ and $R_{22}$ are phenyl groups.

In another preferred embodiment, the composition comprises a siloxane compound comprising a plurality of siloxane repeating units, wherein about 10 mol. % or more of the siloxane repeating units are cyclotrisiloxane repeating units. The cyclotrisiloxane repeating units preferably are independently selected from the group consisting of cyclotrisiloxane repeating units conforming to the structure of Formula (XL) below:

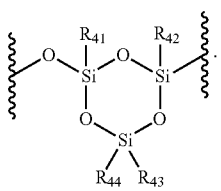

(XL)

In the structure of Formula (XL), $R_{41}$ and $R_{42}$ are independently selected from the group consisting of alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, aryl groups, substituted aryl groups, heteroaryl groups, and substituted heteroaryl groups. $R_{43}$ and $R_{44}$ are independently selected from the group consisting of haloalkyl groups, aralkyl groups, aryl groups, substituted aryl groups, heteroaryl groups, and substituted heteroaryl groups.

This siloxane compound can be any suitable siloxane compound possessing the amount of cyclotrisiloxane moieties recited above. Suitable siloxane compounds and methods for making the same are described, for example, in U.S. patent application Ser. No. 14/244,193 filed on Apr. 3, 2014, which application published as U.S. Patent Application Publication No. US 2014/0309448 A1 on Oct. 16, 2014 and is hereby incorporated by reference for its disclosure of such siloxane compounds and processes for making the same. In the structure of Formula (XL) and the structures that follow, the partial bonds (i.e., the bonds truncated by the wavy line) represent bonds to adjacent moieties or repeating units within the second siloxane compound. In a preferred embodiment, $R_{41}$ and $R_{42}$ are independently selected from the group consisting of alkyl groups and substituted alkyl groups, and $R_{43}$ and $R_{44}$ are independently selected from the group consisting of haloalkyl groups, aralkyl groups, and aryl groups. In a more specific preferred embodiment, $R_{41}$ and $R_{42}$ are independently selected from the group consisting of $C_1$-$C_8$ alkyl groups and $C_1$-$C_8$ substituted alkyl groups, and $R_{43}$ and $R_{44}$ are independently selected from the group consisting of $C_1$-$C_8$ haloalkyl groups, $C_6$-$C_{10}$ aryl groups, and $C_7$-$C_{31}$ aralkyl groups. In another preferred embodiment, $R_{41}$ and $R_{42}$ are independently selected from the group consisting of $C_1$-$C_8$ alkyl groups, and $R_{43}$ and $R_{44}$ are independently selected from the group consisting of $C_6$-$C_{10}$ aryl groups. In another preferred embodiment, $R_{41}$ and $R_{42}$ are methyl groups, and $R_{43}$ and $R_{44}$ are phenyl groups.

The siloxane compound can comprise any suitable amount of siloxane repeating units conforming to the structure of Formula (XL). Preferably, about 10 mol. % or more of the siloxane repeating units in the siloxane compound conform to the structure of Formula (XL). More preferably, about 15 mol. % or more, about 20 mol. % or more, about 25 mol. % or more, about 30 mol. % or more, about 35 mol. % or more, about 40 mol. % or more, about 45 mol. % or more, about 50 mol. % or more, about 55 mol. % or more, about 60 mol. % or more, about 65 mol. % or more, about 70 mol. % or more, about 75 mol. % or more, about 80 mol. % or more, about 85 mol. % or more, or about 90 mol. % or more of the siloxane repeating units in the siloxane compound conform to the structure of Formula (XL).

The cyclotrisiloxane repeating units present in this siloxane compound possess the same basic structure (i.e., a structure conforming to Formula (XL)), but all of the repeating units are not necessarily substituted with the same groups. In other words, the siloxane compound can contain cyclotrisiloxane repeating units that differ in the selection of the $R_{41}$, $R_{42}$, $R_{43}$, and $R_{44}$ substituents.

This siloxane compound can comprise siloxane units in addition to those conforming to the structure of Formula (XL). For example, in a preferred embodiment, the siloxane compound can comprise one or more siloxane moieties conforming to the structure of Formula (L) below:

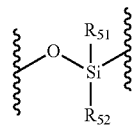

(L)

In the structure of Formula (L), $R_{51}$ and $R_{52}$ are independently selected from the group consisting of alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, aryl groups, substituted aryl groups, heteroaryl groups, substituted heteroaryl groups, and siloxy groups. More preferably, $R_{51}$ and $R_{52}$ are independently selected from the group consisting of $C_1$-$C_{30}$ alkyl groups (e.g., $C_1$-$C_8$ alkyl groups), $C_2$-$C_{30}$ alkenyl groups (e.g., $C_2$-$C_8$ alkenyl groups), $C_1$-$C_{30}$ haloalkyl groups (e.g., $C_1$-$C_8$ haloalkyl groups), $C_6$-$C_{30}$ aryl groups (e.g., $C_6$-$C_{10}$ aryl groups), $C_7$-$C_{31}$ aralkyl groups, $C_3$-$C_9$ trialkylsiloxy groups, $C_8$-$C_{26}$ aryldialkylsiloxy groups, $C_{13}$-$C_{28}$ alkyldiarylsiloxy groups, and $C_{18}$-$C_{30}$ triarylsiloxy groups. More preferably, $R_{51}$ and $R_{52}$ are independently selected from the group consisting of $C_1$-$C_8$ alkyl groups, $C_1$-$C_8$ haloalkyl groups, $C_6$-$C_{10}$ aryl groups, and $C_7$-$C_{31}$ aralkyl groups. Most preferably, $R_{51}$ and $R_{52}$ are independently selected from the group consisting of $C_1$-$C_8$ alkyl groups, with methyl groups being particularly preferred.

The structures drawn above only represent repeating units within this siloxane compound. The siloxane compound further comprises terminating groups. These terminating groups can be any suitable terminating group for a siloxane compound. In a preferred embodiment, the siloxane compound further comprises silyl terminating groups. Suitable silyl terminating groups include, but are not limited to, trialkylsilyl groups, such as trimethylsilyl groups.

This siloxane compound preferably is an oligomeric or polymeric siloxane compound comprising multiple siloxane moieties including the cyclotrisiloxane moieties described above. Preferably, the siloxane compound has a number average molar mass of about 1,000 g/mol or more. The number average molar mass ($M_n$) of the siloxane compound is more preferably about 2,000 g/mol or more, about 3,000 g/mol or more, or about 4,000 g/mol or more. Preferably, the siloxane compound has a mass average molar mass ($M_w$) that is at least 50% greater than the number average molar mass of the compound. In a series of preferred embodiments, the siloxane compound has a mass average molar mass of about 8,000 g/mol or more, about 10,000 g/mol or more, about 11,000 g/mol or more, or about 12,000 g/mol or more.

In another preferred embodiment, the composition comprises a siloxane compound selected from the group consisting of compounds conforming to the structure of Formula (LX) below

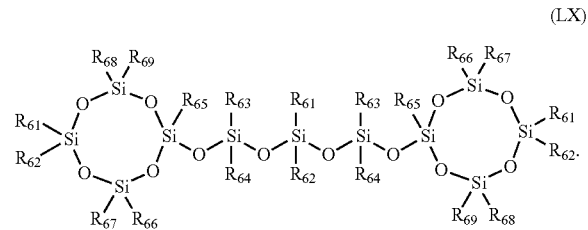

(LX)

In the structure of Formula (LX), $R_{61}$ and $R_{62}$ are independently selected from the group consisting of haloalkyl groups, aralkyl groups, aryl groups, substituted aryl groups, heteroaryl groups, and substituted heteroaryl groups. $R_{63}$, $R_{64}$, $R_{65}$, $R_{66}$, $R_{67}$, $R_{68}$, and $R_{69}$ are independently selected from the group consisting of alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, aryl groups, substituted aryl groups, heteroaryl groups, and substituted heteroaryl groups.

Siloxane compounds conforming to the structure of Formula (LX) are described, for example, in U.S. patent application Ser. No. 14/244,264 filed on Apr. 3, 2014, which application published as U.S. Patent Application Publication No. US 2014/0309450 A1 on Oct. 16, 2014 and is hereby incorporated by reference for its disclosure of such siloxane compounds and processes for making the same. In a preferred embodiment, $R_{63}$, $R_{64}$, $R_{66}$, $R_{67}$, $R_{68}$, and $R_{69}$ are independently selected from the group consisting of alkyl groups and substituted alkyl groups, and $R_{61}$, $R_{62}$, and $R_{65}$ are independently selected from the group consisting of haloalkyl groups, aralkyl groups, and aryl groups. In a more specific preferred embodiment, $R_{63}$, $R_{64}$, $R_{66}$, $R_{67}$, $R_{68}$, and $R_{69}$ are independently selected from the group consisting of $C_1$-$C_8$ alkyl groups and $C_1$-$C_8$ substituted alkyl groups, and $R_{61}$, $R_{62}$, and $R_{65}$ are independently selected from the group consisting of $C_1$-$C_8$ haloalkyl groups, $C_6$-$C_{10}$ aryl groups, and $C_7$-$C_{31}$ aralkyl groups. In another preferred embodiment, $R_{63}$, $R_{64}$, $R_{66}$, $R_{67}$, $R_{68}$, and $R_{69}$ are independently selected from the group consisting of $C_1$-$C_8$ alkyl groups, and $R_{61}$, $R_{62}$, and $R_{65}$ are independently selected from the group consisting of $C_6$-$C_{10}$ aryl groups. In another preferred embodiment, $R_{63}$, $R_{64}$, $R_{66}$, $R_{67}$, $R_{68}$, and $R_{69}$ are methyl groups, and $R_{61}$, $R_{62}$, and $R_{65}$ are phenyl groups.

As noted above, the composition of the invention comprises a first siloxane compound, and this first siloxane compound can be any of the particular siloxane compounds described above (i.e., siloxane compounds conforming to the structure of Formula (X), siloxane compounds conforming to the structure of Formula (XX), siloxane compounds comprising cyclotrisiloxane moieties conforming to the structure of Formula (XL), and siloxane compounds conforming to the structure of Formula (LX)). The composition can comprise other siloxane compounds in addition to the first siloxane compound described above. In a preferred embodiment, the composition comprises a second siloxane compound, and the second siloxane compound comprises at least one cyclic siloxane moiety. More preferably, the second siloxane compound comprises two or more cyclic siloxane moieties. Like the first siloxane compound, this second siloxane compound can be an oligomeric siloxane compound or a polymeric siloxane compound. In a preferred embodiment, the composition comprises at least two siloxane compounds selected from the various groups described above (i.e., siloxane compounds conforming to the structure of Formula (X), siloxane compounds conforming to the structure of Formula (XX), siloxane compounds comprising cyclotrisiloxane moieties conforming to the structure of Formula (XL), and siloxane compounds conforming to the structure of Formula (LX)). In one particular preferred embodiment, the composition comprises a first siloxane compound selected from the group consisting of compounds conforming to the structure of Formula (XX) and a second siloxane compound selected from the group consisting of compounds comprising cyclotrisiloxane moieties conforming to the structure of Formula (XL). In another preferred embodiment, the composition comprises a first siloxane compound selected from the group consisting of compounds conforming to the structure of Formula (XX), a second siloxane compound selected from the group consisting of compounds comprising cyclotrisiloxane moieties conforming to the structure of Formula (XL), and a third siloxane compound selected from the group consisting of siloxane compounds conforming to the structure of Formula (LX).

In those embodiments of the composition comprising more than one siloxane compound, the different siloxane compounds can be present in the composition in any suitable relative amounts. For example, the first siloxane compound (e.g., a compound conforming to the structure of Formula (XX)) and the second siloxane compound (e.g., a compound comprising cyclotrisiloxane moieties conforming to the structure of Formula (XL)) can be present in a ratio of about 1 part or more of the first siloxane compound to about 1 part of the second siloxane compound. Preferably, the first siloxane compound (e.g., a compound conforming to the structure of Formula (XX)) and the second siloxane compound (e.g., a compound comprising cyclotrisiloxane moieties conforming to the structure of Formula (XL)) are present in a ratio of about 2 parts or more (e.g., about 3 parts) of the first siloxane compound to about 1 part of the second siloxane compound. In those compositions comprising the third siloxane compound, the third siloxane compound (e.g., a compound conforming to the structure of Formula (LX)) can be present in the composition in a ratio of about 1 part or more of the first siloxane compound (e.g., a compound conforming to the structure of Formula (XX)) to about 1 part of the third siloxane compound. More preferably, the third siloxane compound (e.g., a compound conforming to the structure of Formula (LX)) can be present in the composition in a ratio of about 2 parts or more, about 3 parts or more, or about 4 parts or more of the first siloxane compound (e.g., a compound conforming to the structure of Formula (XX)) to about 1 part of the third siloxane compound.

As noted above, the composition of the invention comprises a first salt in addition to the first siloxane compound. The first salt preferably comprises a conjugate base of a volatile organic acid. In other words, the first salt comprises an anion, and the anion preferably is a conjugate base of a volatile organic acid. The first salt also comprises a cation that balances the charge of the anion.

As used herein, the term "volatile organic acid" refers to organic acids having a boiling point of about 200° C. or less or a decomposition temperature of about 200° C. or less. In a preferred embodiment, the volatile organic acid has a boiling point of about 190° C. or less or a decomposition temperature of about 190° C. or less. In another preferred embodiment, the volatile organic acid has a boiling point of about 180° C. or less or a decomposition temperature of about 180° C. or less. In another preferred embodiment, the volatile organic acid has a boiling point of about 170° C. or less or a decomposition temperature of about 170° C. or less. In another preferred embodiment, the volatile organic acid has a boiling point of about 160° C. or less or a decomposition temperature of about 160° C. or less. In another preferred embodiment, the volatile organic acid has a boiling point of about 150° C. or less or a decomposition temperature of about 150° C. or less.

The volatile organic acid can exhibit any suitable $pK_a$. Preferably, the volatile organic acid preferably exhibits a $pK_a$ of about 6.5 or less. The volatile organic acid more preferably exhibits a $pK_a$ of about 6 or less, about 5.5 or less, about 5 or less, about 4.5 or less, or about 4 or less. The $pK_a$ of the volatile organic acid preferably is greater than 0. The volatile organic acid more preferably exhibits a $pK_a$ that is about 0.5 or more, about 1 or more, about 1.5 or more, about 2 or more, about 2.5 or more, about 3 or more, or about 3.5 or more. Thus, in a series of preferred embodiments, the volatile organic acid exhibits a $pK_a$ of about 0 to about 6.5 (e.g., about 0.5 to about 6.5, about 1 to about 6.5, about 1.5 to about 6.5, about 2 to about 6.5, about 2.5 to about 6.5, about 3 to about 6.5, or about 3.5 to about 6.5), about 0 to about 6 (e.g., about 0.5 to about 6, about 1 to about 6, about 1.5 to about 6, about 2 to about 6, about 2.5 to about 6, about 3 to about 6, or about 3.5 to about 6), about 0 to about 5.5 (e.g., about 0.5 to about 5.5, about 1 to about 5.5, about 1.5 to about 5.5, about 2 to about 5.5, about 2.5 to about 5.5, about 3 to about 5.5, or about 3.5 to about 5.5), about 0 to about 5 (e.g., about 0.5 to about 5, about 1 to about 5, about 1.5 to about 5, about 2 to about 5, about 2.5 to about 5, about 3 to about 5, or about 3.5 to about 5), about 0 to about 4.5 (e.g., about 0.5 to about 4.5, about 1 to about 4.5, about 1.5 to about 4.5, about 2 to about 4.5, about 2.5 to about 4.5, about 3 to about 4.5, or about 3.5 to about 4.5), or about 0 to about 4 (e.g., about 0.5 to about 4, about 1 to about 4, about 1.5 to about 4, about 2 to about 4, about 2.5 to about 4, about 3 to about 4, or about 3.5 to about 4). In some particularly preferred embodiments, the volatile organic acid exhibits a $pK_a$ of about 1.5 to about 5.5, about 2 to about 5, about 2.5 to 4.5, about 3 to about 4, or about 3.5 to about 4.

The volatile organic acid can comprise any acidic group. Examples of suitable acidic groups include, but are not limited to, carboxyl groups, sulfonyl hydroxide groups, thiol groups, enol groups, and phenol groups. Preferably, the volatile organic acid comprises a carboxyl group. In other words, the volatile organic acid preferably is a carboxylic acid.

The volatile organic acid can be any suitable organic acid exhibiting the properties listed above. In a preferred embodiment, the volatile organic acid is selected from the group consisting of formic acid, acetic acid, malonic acid, succinic acid, carbonic acid, propionic acid, butyric acid, valeric acid, and mixtures thereof. More preferably, the volatile organic acid is selected from the group consisting of formic acid, acetic acid, malonic acid, succinic acid, carbonic acid, and mixtures thereof. In a particularly preferred embodiment, the volatile organic acid is selected from the group consisting of formic acid, acetic acid, and malonic acid.

As noted above, the first salt comprises a conjugate base of a volatile organic acid. The first salt also comprises a cation to balance the charge of the conjugate base. The cation of the first salt can be any suitable cation. Preferably, the cation is selected from the group consisting of a lithium cation, a sodium cation, a potassium cation, ammonium cations, and phosphonium cations. As utilized herein, the term "ammonium cations" refers to the group containing the ammonium cation ($NH_4^+$) and derivatives thereof formed by substitution of one or more of the hydrogen atoms with a univalent group, such as a halogen atom, an alkyl group, or a substituted alkyl group. As utilized herein, the term "phosphonium cations" refers to the group containing the phosphonium cation ($PH_4^+$) and derivatives thereof formed by substitution of one or more of the hydrogen atoms with a univalent group, such as a halogen atom, an alkyl group, or a substituted alkyl group. More preferably, the cation is selected from the group consisting of alkylammonium cations and alkylphosphonium cations. Suitable alkylammonium cations include, but are not limited to, the tetraethylammonium cation, the tetrapropylammonium cation, and the tetrabutylammonium cation. Suitable alkylphosphonium cations include, but are not limited to, the tetraethylphosphonium cation, the tetrapropylphosphonium cation, and the tetrabutylphosphonium cation. In a particularly preferred embodiment, the cation is selected from the group consisting of the tetramethylammonium cation, the tetrabutylammonium cation, and the tetrabutylphosphonium cation, with the tetrabutylphosphonium cation being particularly preferred.

Thus, in a set of preferred embodiments, the first salt is selected from the group consisting of tetramethylammonium formate, tetramethylammonium acetate, tetramethylammonium malonate, tetramethylammonium succinate, tetramethylammonium bicarbonate, tetrabutylammonium formate, tetrabutylammonium acetate, tetrabutylammonium malonate, tetrabutylammonium succinate, tetrabutylammonium bicarbonate, tetrabutylphosphonium formate, tetrabutylphosphonium acetate, tetrabutylphosphonium malonate, tetrabutylphosphonium succinate, tetrabutylphosphonium bicarbonate, and mixtures thereof. More preferably, the first salt is selected from the group consisting of tetrabutylphosphonium formate, tetrabutylphosphonium acetate, tetrabutylphosphonium malonate, and mixtures thereof.

The first salt can be present in the composition in any suitable amount. Preferably, the first salt is present in the composition in an amount of about 100 ppm or more based on the total weight of the composition. The first salt is more preferably present in the composition in an amount of about 200 ppm or more, about 300 ppm or more, about 350 ppm, or more, about 400 ppm or more, about 450 ppm or more, about 500 ppm or more, or about 550 ppm or more based on the total weight of the composition. The amount of the first salt present in the composition preferably is about 2,000 ppm or less, more preferably about 1,500 ppm or less, more preferably about 1,000 ppm or less, more preferably about 800 ppm or less based on the total weight of the composition. In a series of preferred embodiments, the first salt is present in the composition in an amount of about 100 ppm to about 2,000 ppm, preferably about 200 ppm to about 1,500 ppm, more preferably about 300 ppm to about to about 1,000 ppm, and more preferably about 350 ppm to about 800 ppm based on the total weight of the composition.

In certain embodiments of the composition, the composition preferably comprises a second salt in addition to the first salt. The second salt can be any suitable salt. Preferably, the second salt is a hydroxide salt (i.e., a salt comprising the hydroxide anion). Hydroxide salts suitable for use in the composition can comprise any suitable cation. Preferably, the cation of the hydroxide salt is the same as the cation of the first salt. Thus, in a preferred embodiment, the cation of the hydroxide salt is selected from the group consisting of a lithium cation, a sodium cation, a potassium cation, ammonium cations, and phosphonium cations. More preferably, the cation of the hydroxide salt is selected from the group consisting of alkylammonium cations and alkylphosphonium cations. Suitable alkylammonium cations include, but are not limited to, the tetraethylammonium cation, the tetrapropylammonium cation, and the tetrabutylammonium cation. Suitable alkylphosphonium cations include, but are not limited to, the tetraethylphosphonium cation, the tetrapropylphosphonium cation, and the tetrabutylphosphonium cation. In a particularly preferred embodiment, the cation of the hydroxide salt is selected from the group consisting of the tetramethylammonium cation, the tetrabutylammonium cation, and the tetrabutylphosphonium cation, with the tetrabutylphosphonium cation being particularly preferred.

Thus, in a preferred embodiment, the composition comprises a hydroxide salt selected from the group consisting of lithium hydroxide, sodium hydroxide, potassium hydroxide, ammonium hydroxides, phosphonium hydroxides, and mixtures thereof. More preferably, the composition comprises a hydroxide salt selected from the group consisting of lithium hydroxide, sodium hydroxide, potassium hydroxide, tetramethylammonium hydroxide, tetrabutylammonium hydroxide, tetrabutylphosphonium hydroxide, and mixtures thereof. More preferably, the composition comprises a hydroxide salt selected from the group consisting of tetramethylammonium hydroxide, tetrabutylammonium hydroxide, tetrabutylphosphonium hydroxide, and mixtures thereof. In another preferred embodiment, the composition comprises tetrabutylphosphonium hydroxide.

When the composition comprises both the first salt and the second salt, each salt can be provided in its pure form and separately added to the composition. Alternatively, a mixture of the first salt and the second salt can be prepared by a simple acid-base reaction between a hydroxide salt and a volatile organic acid. For example, a mixture of the first salt and the second salt can be prepared by adding the desired amount of the volatile organic acid to an aqueous solution containing the hydroxide salt. When these two components are combined, the acetic acid and tetrabutylphosphonium hydroxide react to form tetrabutylphosphonium acetate in the aqueous solution. The water in the resulting aqueous solution containing the mixture of the first salt and the second salt can then be removed under vacuum to produce a mixture of the salts that can be combined with the siloxane compound(s) to form the composition.

When the second salt is present in the composition, the first salt and the second salt can be present in any suitable amounts. Generally, the combined amounts of the first salt and the second present in the composition fall within the ranges provided above for the amount of the first salt present in the composition. Further, when the second salt is present in the composition, the first salt and the second salt can be present in the composition in any suitable relative amounts. Preferably, the ratio of the amount (by weight) of first salt present in the composition to the amount (by weight) of second salt present in the composition is about 1:10 or more, about 1:9 or more, about 1:8 or more, about 1:7 or more, about 1:6 or more, about 1:5 or more, about 1:4 or more, about 1:3 or more, about 1:2 or more, about 1:1 or more, about 2:1 or more, about 3:1 or more, about 4:1 or more, about 5:1 or more, about 6:1 or more, about 7:1 or more, about 8:1 or more, about 9:1 or more, or about 10:1 or more. In another preferred embodiment, the ratio of the amount (by weight) of first salt present in the composition to the amount (by weight) of second salt present in the composition is about 25:1 or less, about 20:1 or less, or about 15:1 or less.

In a series of preferred embodiments, the ratio of the amount (by weight) of first salt present in the composition to the amount (by weight) of second salt present in the composition is preferably about 1:3 to about 6:1, more preferably about 1:2 to about 5:1, more preferably about 1:1 to about 5:1, and more preferably about 2:1 to about 5:1 (e.g., about 2:1 to about 4:1).

The composition of the invention can be used in any suitable application. For example, the composition of the invention can be used to produce a cross-linked siloxane network, such as that found in a siloxane elastomer. These siloxane elastomers can be used in a variety of end-uses, such as encapsulants for light emitting diodes (LEDs) and other electronic components. The cross-linked siloxane network is formed via the ring-opening polymerization of the siloxane compound(s) present in the composition. This ring-opening polymerization typically is initiated by a base catalyst, such as tetrabutylphosphonium hydroxide. The inventors found that strong bases, such as tetrabutylphosphonium hydroxide, would produce compositions that cured to form the cross-linked siloxane network in a relatively short period of time (even at ambient temperatures) after the components of the composition were combined. While fast curing of the compositions may be desired in certain applications, there are some applications in which end-users desire compositions that have a "pot life" or "working time" of several hours (e.g., about 7 or about 8 hours) at ambient temperatures. Accordingly, the inventors sought a means to moderate the activity of the base at ambient temperatures (to provide longer pot life and working time) while not deleteriously affecting the cure time at elevated temperatures or the properties of the finished elastomer. Surprisingly, the inventors found that replacing at least a portion of the base catalyst with a first salt comprising the conjugate base of a volatile organic acid produced a composition exhibiting the desired properties. As described above, a portion of the base catalyst can be replaced with the first salt by reacting a volatile organic acid with an aqueous solution of the base catalyst (e.g., tetrabutylphosphonium hydroxide). However, the inventors also found that satisfactory results could be obtained when the base is replaced entirely with a first salt, such as tetrabutylphosphonium malonate.

While not wishing to be bound to any particular theory, it is believed that the conjugate base of the volatile organic acid decomposes or volatilizes in the composition, and this process eventually leads to the production of a hydroxide salt (i.e., a salt comprising the cation of the first salt and a hydroxide anion). The resulting hydroxide salt then catalyzes the ring-opening of the cyclic siloxane moiety present on the siloxane compound(s). In particular, the hydroxide anions attack a siloxane linkage (—Si—O—Si—) in the cyclic siloxane moiety and cleave the linkage to produce two silanolate ions, the charges of which are balanced by cations originating from the first salt. The siloxane linkages present in the cyclic siloxane moiety are believed to be particularly susceptible to cleavage by the hydroxide anion due to the strain present in those bonds from the cyclic arrangement. Of course, in those embodiments in which the composition comprises a second salt that is a hydroxide salt, the hydroxide anions of the second salt can likewise catalyze the ring-opening of the cyclic siloxane moiety via the pathway described above. However, it is believed that hastening the decomposition or volatilization of the conjugate base of the volatile organic acid will lead to the production of greater amounts of hydroxide anions, thereby increasing the rate at which the ring-opening and subsequent cross-linking reactions occur.

Thus, in a second embodiment, the invention provides a method for producing a cross-linked siloxane network. The method comprises the steps of (a) providing a first siloxane compound, the first siloxane compound comprising at least one cyclic siloxane moiety; (b) providing a first salt, the first salt comprising a conjugate base of a volatile organic acid; (c) combining the first siloxane compound and the first salt to produce a reaction mixture; (d) heating the reaction mixture to a temperature sufficient for the first salt to open the ring of the cyclic siloxane moiety; and (e) maintaining the reaction mixture at an elevated temperature so that at least a portion of the opened cyclic siloxane moieties react with each other to produce a cross-linked siloxane network.

The first siloxane compound and the first salt utilized in the method can be any of the siloxane compounds and first salts described above in connection with the composition embodiment of the invention. As with the composition described above, the method can utilize a mixture of different siloxane compounds. For example, in a preferred embodiment, the method uses at least two siloxane compounds selected from the various groups described above (i.e., siloxane compounds conforming to the structure of Formula (X), siloxane compounds conforming to the structure of Formula (XX), siloxane compounds comprising cyclotrisiloxane moieties conforming to the structure of Formula (XL), and siloxane compounds conforming to the structure of Formula (LX)). In one particular preferred embodiment, the method uses a first siloxane compound selected from the group consisting of compounds conforming to the structure of Formula (XX) and a second siloxane compound selected from the group consisting of compounds comprising cyclotrisiloxane moieties conforming to the structure of Formula (XL). In another preferred embodiment, the method uses a first siloxane compound selected from the group consisting of compounds conforming to the structure of Formula (XX), a second siloxane compound selected from the group consisting of compounds comprising cyclotrisiloxane moieties conforming to the structure of Formula (XL), and a third siloxane compound selected from the group consisting of siloxane compounds conforming to the structure of Formula (LX). When a mixture of different siloxane compounds is used, the different siloxane compounds can be combined in a single composition, and the first salt is added to this composition to produce the reaction mixture described above.

The first salt can be added directly to the first siloxane compound or a composition comprising the first siloxane compound. Alternatively, the first salt compound can be contained in a liquid carrier for ease of handling and mixing of the components in use. The liquid carrier for the first salt can be any material that is compatible with the first siloxane compound and the cross-linked siloxane network produced by the method. Preferably, the liquid carrier is a siloxane compound, such as a silicone fluid. In a preferred embodiment, the liquid carrier for the first salt compound is a phenylmethyl silicone fluid. This combination of a silicone fluid and the first salt are provided as a composition that, in the practice of the method of the invention, is combined with another composition that comprises the first siloxane compound.

As with the composition embodiment of the invention, the method can utilize a second salt in addition to the first salt. The second salt used in the method can be any of the second salts described above in connection with the composition embodiment of the invention. As noted above, the second salt preferably is a hydroxide salt. In a preferred embodiment, the second salt is a hydroxide salt comprising a cation that is the same as the cation in the first salt.

Once the first siloxane compound and the first salt are combined to produce the reaction mixture, the reaction mixture preferably is heated to an elevated temperature. By heating the reaction mixture to an elevated temperature, the first salt (or the combination of the first salt and the second salt) opens the ring of the cyclic siloxane moiety present in the first siloxane compound. As is suggested above, the conjugate base of the volatile organic acid is believed to degrade or volatilize at elevated temperatures, thereby producing a hydroxide salt that catalyzes the ring-opening of the cyclic siloxane moieties at ambient temperatures. Accordingly, heating the reaction mixture to an elevated temperature and maintaining the reaction mixture at this elevated temperature hastens the reaction so that the ring-opening and subsequent cross-linking occur within the desired amount of time. Once the cyclic siloxane moieties are opened by the first salt compound, the resulting ring-opened moieties on the compound then react with other molecules in the composition to produce cross-links between different molecules in the composition, which ultimately results in the cross-linked siloxane network.

The reaction mixture can be heated to any suitable temperature. Preferably, the reaction mixture is heated to a temperature of about 100° C. or more. In a preferred embodiment, the reaction mixture is heated to a temperature of about 110° C. or more, about 120° C. or more, about 130° C. or more, about 140° C. or more, or about 150° C. or more. The reaction mixture preferably is not heated to a temperature of above 200° C. In the practice of the method, the reaction mixture can be heated and maintained at a first elevated temperature, and then maintained at a second elevated temperature that is different from (either above or below) the first elevated temperature. For example, in a preferred embodiment, the reaction mixture is heated to and maintained at a first elevated temperature of about 110° C. or about 115° C. for about 1 hour and then heated to and maintained at a second elevated temperature of about 150° C. for about 1 hour.

The reaction mixture can be maintained at the elevated temperature(s) for any suitable amount of time. Generally, the reaction mixture is maintained at the elevated temperature(s) for a sufficient amount of time for the ring-opening and subsequent cross-linking reactions to proceed to substantial completion. In a preferred embodiment, the reaction mixture is maintained at the elevated temperature(s) for a total time of about 30 minutes or more, more preferably about 60 minutes or more, more preferably about 90 minutes or more, or more preferably about 120 minutes or more.

The cross-linked siloxane polymer produced from the composition and method described above can be used in many applications. For example, the cross-linked siloxane polymer can be used as an encapsulant for light emitting diodes (LEDs). Because the cross-linked silicone polymer can be made from raw materials containing relatively large amounts of groups that increase the refractive index of the polymer (e.g., haloalkyl groups, aralkyl groups, aryl groups, substituted aryl groups, heteroaryl groups, and substituted heteroaryl groups), it is believed that the cross-linked silicone polymer can be particularly effective as an encapsulant for high intensity LEDs. In such applications, an encapsulant having a higher refractive index provides a progressive transition from the relatively high refractive index of the semiconductor crystal (where the light is produced on the LED) to the air surrounding the LED. The relatively large difference between the refractive index of the semiconductor crystal and the surrounding air leads to internal reflection of light within the LED's semiconductor crystal. These internal reflections reduce the amount of light that escapes from the semiconductor crystal and is emitted by the LED. By providing a medium with an intermediate refractive index (i.e., a refractive index between the high refractive index of the semiconductor crystal and the refractive index of air), the encapsulant material (i.e., the cross-linked silicone polymer) can reduce the amount of light that is internally reflected back into the semiconductor crystal, thereby increasing the amount of light emitted by the LED. This use of similar cross-linked silicone polymers is described, for example, in U.S. patent application Ser. No. 14/244,236 filed on Apr. 3, 2014, which application published as U.S. Patent Application Publication No. 2014/0306259 on Oct. 16, 2014 and is hereby incorporated by reference for its disclosure of methods of making such encapsulant materials and uses for the same.

The following examples further illustrate the subject matter described above but, of course, should not be construed as in any way limiting the scope thereof.

Example 1

This example demonstrates the production of a composition according to the invention and the production of a cross-linked silicone elastomer from the composition.

A first part ("Part A") was prepared by combining (i) a siloxane compound comprising cyclotrisiloxane repeating units conforming to the structure of Formula (XL), (ii) a siloxane compound conforming to the structure of Formula (XX), (iii) a siloxane compound conforming to the structure of Formula (LX), and (iv) 2,2,4,4,-tetramethyl-6,6-diphenylcyclotrisiloxane ("diphenyl-$D_3$"). The siloxane compound comprising cyclotrisiloxane repeating units conforming to the structure of Formula (XL) was a polymer having a mass average molar mass of approximately 15,000 g/mol. In the repeating units conforming to the structure of Formula (XL), the groups $R_{41}$ and $R_{42}$ were methyl groups, and the groups $R_{43}$ and $R_{44}$ were phenyl groups. In addition to the repeating units conforming to the structure of Formula (XL), the polymer contained trimethylsilyl terminating groups. In the compound conforming to the structure of Formula (XX), the variables a and d were 0, the variables b and c were 1, the groups $R_{23}$, $R_{24}$, $R_{25}$, $R_{26}$, and $R_{27}$ were methyl groups, and the groups $R_{21}$ and $R_{22}$ were phenyl groups. In the compound conforming to the structure of Formula (LX), the groups $R_{63}$, $R_{64}$, $R_{66}$, $R_{67}$, $R_{68}$, and $R_{69}$ were methyl groups, and $R_{61}$, $R_{62}$, and $R_{65}$ were phenyl groups. The four components of Part A were combined in the following proportions: (i) 30 parts by weight of the polymer containing repeating units conforming to the structure of Formula (XL); (ii) 35 parts by weight of the compound conforming to the structure of Formula (XX); (iii) 15 parts by weight of the compound conforming to the structure of Formula (LX); and (iv) 20 parts by weight of diphenyl-$D_3$.

A second part ("Part B-1") was prepared by mixing equal amounts (by weight) of tetrabutylphosphonium acetate and tetrabutylphosphonium hydroxide in a phenylmethyl silicone fluid (PM-125 from Clearco Products). The total combined concentration of tetrabutylphosphonium acetate and tetrabutylphosphonium hydroxide in Part B-1 was approximately 12,000 ppm.

A composition ("Sample 1") was prepared by mixing 20 parts by weight of Part A and 1 part by weight of Part B. A portion of Sample 1 was then cured at a temperature of approximately 115° C. for approximately 1 hour and then at a temperature of approximately 150° C. for another hour. The resulting silicone elastomer exhibited a durometer hardness of Shore A 50.

Another portion of Sample 1 was retained to determine the pot life or working time of the composition when it was maintained at ambient temperatures (e.g., approximately 20-25° C.). The initial viscosity of Sample 1 was measured using a rheometer (Brookfield Model No. DV3THA rheometer) and the value was recorded. The viscosity of the composition was then periodically tested at regular intervals to determine how the viscosity changed with time. These subsequent viscosity values were also recorded. The composition was considered to have reached its pot life when the viscosity of the composition exceeded 120% of the initial viscosity. Using this method, the pot life of Sample 1 was determined to be approximately 6 hours, which is nearly double the pot life of a similar composition in which the second part contained only tetrabutylphosphonium hydroxide (such a composition exhibits a pot life of approximately 2-3 hours).

Example 2

This example demonstrates the production of a composition according to the invention and the production of a cross-linked silicone elastomer from the composition.

A composition (Sample 2) was prepared by mixing 20 parts by weight of Part A from Example 1 with 1 part by weight of Part B-2. Part B-2 was prepared by mixing approximately 70 parts by weight of tetrabutylphosphonium acetate and approximately 30 parts by weight of tetrabutylphosphonium hydroxide in a phenylmethyl silicone fluid (PM-125 from Clearco Products). The total combined concentration of tetrabutylphosphonium acetate and tetrabutylphosphonium hydroxide in Part B-2 was approximately 12,000 ppm.

A portion of Sample 2 was then cured at a temperature of approximately 115° C. for approximately 1 hour and then at a temperature of approximately 150° C. for another hour. The resulting silicone elastomer exhibited a durometer hardness of Shore A 47.

The pot life of Sample 2 was measured in accordance with the procedure described in Example 1. The pot life of Sample 2 was determined to be approximately 13 hours.

Example 3

This example demonstrates the production of a composition according to the invention and the production of a cross-linked silicone elastomer from the composition.

A composition (Sample 3) was prepared by mixing 20 parts by weight of Part A from Example 1 with 1 part by weight of Part B-3. Part B-3 was prepared by mixing approximately 75 parts by weight of tetrabutylphosphonium acetate and approximately 25 parts by weight of tetrabutylphosphonium hydroxide in a phenylmethyl silicone fluid (PM-125 from Clearco Products). The total combined concentration of tetrabutylphosphonium acetate and tetrabutylphosphonium hydroxide in Part B-3 was approximately 15,000 ppm.

A portion of Sample 3 was then cured at a temperature of approximately 115° C. for approximately 1 hour and then at a temperature of approximately 150° C. for another hour. The resulting silicone elastomer exhibited a durometer hardness of Shore A 47.

The pot life of Sample 3 was measured in accordance with the procedure described in Example 1. The pot life of Sample 3 was determined to be approximately 12 hours.

Example 4

This example demonstrates the production of a composition according to the invention and the production of a cross-linked silicone elastomer from the composition.

A composition (Sample 4) was prepared by mixing 20 parts by weight of Part A from Example 1 with 1 part by weight of Part B-4. Part B-4 was prepared by mixing approximately 0.85 molar equivalents of formic acid with 1 molar equivalent of tetrabutylphosphonium hydroxide in water. A phenylmethyl silicone fluid (PM-125 from Clearco Products) was added to the solution, and the mixture was kept under vacuum at room temperature until all of the water had been removed. The total combined concentration of tetrabutylphosphonium formate and tetrabutylphosphonium hydroxide in Part B-4 was approximately 12,000 ppm.

A portion of Sample 4 was then cured at a temperature of approximately 115° C. for approximately 1 hour and then at a temperature of approximately 150° C. for another hour. The resulting silicone elastomer exhibited a durometer hardness of Shore A 46.

The pot life of Sample 4 was measured in accordance with the procedure described in Example 1. The pot life of Sample 4 was determined to be approximately 18 hours.

Example 5

This example demonstrates the production of a composition according to the invention and the production of a cross-linked silicone elastomer from the composition.

A composition (Sample 5) was prepared by mixing 20 parts by weight of Part A from Example 1 with 1 part by weight of Part B-5. Part B-5 was prepared by mixing approximately 0.9 molar equivalents of formic acid with 1 molar equivalent of tetrabutylphosphonium hydroxide in water. A phenylmethyl silicone fluid (PM-125 from Clearco Products) was added to the solution, and the mixture was kept under vacuum at room temperature until all of the water had been removed. The total combined concentration of tetrabutylphosphonium formate and tetrabutylphosphonium hydroxide in Part B-5 was approximately 12,000 ppm.

A portion of Sample 5 was then cured at a temperature of approximately 115° C. for approximately 1 hour and then at a temperature of approximately 150° C. for another hour. The resulting silicone elastomer exhibited a durometer hardness of Shore A 47.

The pot life of Sample 5 was measured in accordance with the procedure described in Example 1. The pot life of Sample 5 was determined to be approximately 12 hours.

Example 6

This example demonstrates the production of a composition according to the invention and the production of a cross-linked silicone elastomer from the composition.

A composition (Sample 6) was prepared by mixing 20 parts by weight of Part A from Example 1 with 1 part by weight of Part B-6. Part B-6 contained approximately 12,000 ppm of tetrabutylphosphonium malonate in a phenylmethyl silicone fluid (PM-125 from Clearco Products).

A portion of Sample 6 was then cured at a temperature of approximately 115° C. for approximately 1 hour and then at a temperature of approximately 150° C. for another hour. The resulting silicone elastomer exhibited a durometer hardness of Shore A 40.

The pot life of Sample 6 was measured in accordance with the procedure described in Example 1. The pot life of Sample 6 was determined to be approximately 11 hours.

Example 7

This example demonstrates the production of a composition according to the invention and the production of a cross-linked silicone elastomer from the composition.

A composition (Sample 7) was prepared by mixing 20 parts by weight of Part A from Example 1 with 1 part by weight of Part B-7. Part B-7 contained approximately 10,000 ppm of tetramethylammonium formate in a phenylmethyl silicone fluid (PM-125 from Clearco Products).

A portion of Sample 7 was then cured at a temperature of approximately 115° C. for approximately 1 hour and then at a temperature of approximately 150° C. for another hour. The resulting silicone elastomer exhibited a durometer hardness of Shore A 30.

The pot life of Sample 7 was measured in accordance with the procedure described in Example 1. The pot life of Sample 7 was determined to be approximately 18 hours.

Example 8

This example demonstrates the production of a composition according to the invention and the production of a cross-linked silicone elastomer from the composition.

A composition (Sample 8) was prepared by mixing 20 parts by weight of Part A from Example 1 with 1 part by weight of Part B-8. Part B-8 contained 20 parts by weight of tetrabutylammonium hydroxide and 80 parts by weight tetramethylammonium formate in a phenylmethyl silicone fluid (PM-125 from Clearco Products). The total combined concentration of tetrabutylammonium hydroxide and tetramethylammonium formate in Part B-8 was approximately 10,000 ppm.

A portion of Sample 8 was then cured at a temperature of approximately 115° C. for approximately 1 hour and then at a temperature of approximately 150° C. for another hour. The resulting silicone elastomer exhibited a durometer hardness of Shore A 43.

The pot life of Sample 8 was measured in accordance with the procedure described in Example 1. The pot life of Sample 8 was determined to be approximately 16 hours.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:
1. A composition comprising:
(a) a first siloxane compound of Formula (X)

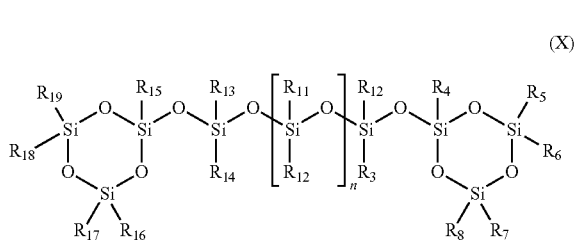

wherein the variable n is selected from the group consisting of integers equal to or greater than 1; $R_2$, $R_3$, $R_4$, $R_5$, $R_6$, $R_7$, $R_8$, $R_{11}$, $R_{12}$, $R_{13}$, $R_{14}$, $R_{15}$, $R_{16}$, $R_{17}$, $R_{18}$, and $R_{19}$ are independently selected from the group consisting of alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, aryl groups, substituted aryl groups, heteroaryl groups, substituted heteroaryl groups, and siloxy groups; at least one of $R_7$ and $R_8$ is different from each of $R_2$, $R_3$, $R_4$, $R_5$, and $R_6$, and at least one of $R_{16}$ and $R_{17}$ is different from each of $R_{13}$, $R_{14}$, $R_{15}$, $R_{18}$, and $R_{19}$; and
(b) a first salt, the first salt comprising a conjugate base of a volatile organic acid, wherein the first salt is selected from the group consisting of tetramethylammonium formate, tetramethylammonium acetate, tetramethylammonium malonate, tetramethylammonium succinate, tetrabutylammonium formate, tetrabutylammonium acetate, tetrabutylammonium malonate, tetrabutylammonium succinate, tetrabutylphosphonium formate, tetrabutylphosphonium acetate, tetrabutylphosphonium malonate, tetrabutylphosphonium succinate, tetrabutylphosphonium bicarbonate, and mixtures thereof.

2. The composition of claim 1, wherein the first salt is selected from the group consisting of tetrabutylphosphonium formate, tetrabutylphosphonium acetate, tetrabutylphosphonium malonate, tetrabutylphosphonium succinate, tetrabutylphosphonium bicarbonate, and mixtures thereof.

3. The composition of claim 1, wherein the composition further comprises a second salt, and the second salt is a hydroxide salt.

4. The composition of claim 3, wherein the second salt is selected from the group consisting of lithium hydroxide, sodium hydroxide, potassium hydroxide, ammonium hydroxides, phosphonium hydroxides, and mixtures thereof.

5. The composition of claim 4, wherein the second salt is selected from the group consisting of ammonium hydroxides, phosphonium hydroxides, and mixtures thereof.

6. The composition of claim 5, wherein the second salt is selected from the group consisting of tetramethylammonium hydroxide, tetrabutylammonium hydroxide, tetrabutylphosphonium hydroxide, and mixtures thereof.

7. The composition of claim 1, wherein the composition further comprises a second siloxane compound, the second siloxane compound comprising at least one cyclic siloxane moiety.

8. A method for producing a cross-linked siloxane network, the method comprising the steps of:
(a) providing a first siloxane compound of Formula (X)

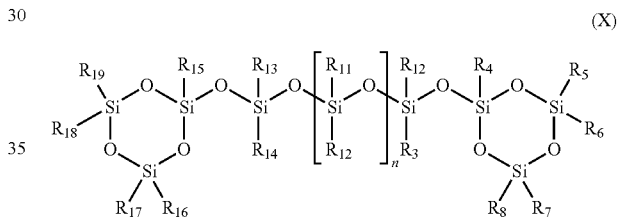

wherein the variable n is selected from the group consisting of integers equal to or greater than 1; $R_2$, $R_3$, $R_4$, $R_5$, $R_6$, $R_7$, $R_8$, $R_{11}$, $R_{12}$, $R_{13}$, $R_{14}$, $R_{15}$, $R_{16}$, $R_{17}$, $R_{18}$, and $R_{19}$ are independently selected from the group consisting of alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, aryl groups, substituted aryl groups, heteroaryl groups, substituted heteroaryl groups, and siloxy groups; at least one of $R_7$ and $R_8$ is different from each of $R_2$, $R_3$, $R_4$, $R_5$, and $R_6$, and at least one of $R_{16}$ and $R_{17}$ is different from each of $R_{13}$, $R_{14}$, $R_{15}$, $R_{18}$, and $R_{19}$;
(b) providing a first salt, the first salt comprising a conjugate base of a volatile organic acid, wherein the first salt is selected from the group consisting of tetramethylammonium formate, tetramethylammonium acetate, tetramethylammonium malonate, tetramethylammonium succinate, tetrabutylammonium formate, tetrabutylammonium acetate, tetrabutylammonium malonate, tetrabutylammonium succinate, tetrabutylphosphonium formate, tetrabutylphosphonium acetate, tetrabutylphosphonium malonate, tetrabutylphosphonium succinate, tetrabutylphosphonium bicarbonate, and mixtures thereof;
(c) combining the first siloxane compound and the first salt to produce a reaction mixture;

(d) heating the reaction mixture to a temperature sufficient for the first salt to open the ring of the cyclic siloxane moiety; and (e) maintaining the reaction mixture at an elevated temperature so that at least a portion of the opened cyclic siloxane moieties react with each other to produce a cross-linked siloxane network.

9. The method of claim 8, wherein the first salt is selected from the group consisting of tetrabutylphosphonium formate, tetrabutylphosphonium acetate, tetrabutylphosphonium malonate, tetrabutylphosphonium succinate, tetrabutylphosphonium bicarbonate, and mixtures thereof.

10. The method of claim 8, wherein the method further comprises the step of providing a second salt, the second salt is a hydroxide salt, and the second salt is combined with the first siloxane compound and the first salt to produce the reaction medium.

11. The method of claim 10, wherein the second salt is selected from the group consisting of lithium hydroxide, sodium hydroxide, potassium hydroxide, ammonium hydroxides, phosphonium hydroxides, and mixtures thereof.

12. The method of claim 11, wherein the second salt is selected from the group consisting of ammonium hydroxides, phosphonium hydroxides, and mixtures thereof.

13. The method of claim 12, wherein the second salt is selected from the group consisting of tetramethylammonium hydroxide, tetrabutylammonium hydroxide, tetrabutylphosphonium hydroxide, and mixtures thereof.

14. The method of claim 8, wherein the method further comprises the step of providing a second siloxane compound, the second siloxane compound comprising at least one cyclic siloxane moiety, and wherein the second siloxane compound is combined with the first siloxane compound and the first salt to produce the reaction mixture.

15. The composition of claim 1, wherein $R_2$, $R_3$, $R_4$, $R_5$, $R_6$, $R_{13}$, $R_{14}$, $R_{15}$, $R_{18}$, and $R_{19}$ are independently selected from the group consisting of alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, and siloxy groups.

16. The composition of claim 15, wherein $R_2$, $R_3$, $R_4$, $R_5$, $R_6$, $R_{13}$, $R_{14}$, $R_{15}$, $R_{18}$, and $R_{19}$ are independently selected from the group consisting of alkyl groups.

17. The composition of claim 16, wherein $R_2$, $R_3$, $R_4$, $R_5$, $R_6$, $R_{13}$, $R_{14}$, $R_{15}$, $R_{18}$, and $R_{19}$ are each methyl.

18. The composition of claim 1, wherein $R_7$, $R_8$, $R_{11}$, $R_{12}$, $R_{16}$, and $R_{17}$ are independently selected from the group consisting of haloalkyl groups, aralkyl groups, aryl groups, substituted aryl groups, heteroaryl groups, and substituted heteroaryl groups.

19. The composition of claim 17, wherein $R_7$, $R_8$, $R_{11}$, $R_{12}$, $R_{16}$, and $R_{17}$ are independently selected from the group consisting of aryl groups.

20. The composition of claim 18, wherein $R_7$, $R_6$, $R_{11}$, $R_{12}$, $R_{16}$, and $R_{17}$ are each phenyl.

21. The method of claim 8, wherein $R_2$, $R_3$, $R_4$, $R_5$, $R_6$, $R_{13}$, $R_{14}$, $R_{15}$, $R_{18}$, and $R_{19}$ are independently selected from the group consisting of alkyl groups, substituted alkyl groups, cycloalkyl groups, substituted cycloalkyl groups, alkenyl groups, substituted alkenyl groups, cycloalkenyl groups, substituted cycloalkenyl groups, heterocyclyl groups, substituted heterocyclyl groups, and siloxy groups.

22. The method of claim 20, wherein $R_2$, $R_3$, $R_4$, $R_5$, $R_6$, $R_{13}$, $R_{14}$, $R_{15}$, $R_{18}$, and $R_{19}$ are independently selected from the group consisting of alkyl groups.

23. The method of claim 21, wherein $R_2$, $R_3$, $R_4$, $R_5$, $R_6$, $R_{13}$, $R_{14}$, $R_{15}$, $R_{18}$, and $R_{19}$ are each methyl.

24. The method of claim 8, wherein $R_7$, $R_8$, $R_{11}$, $R_{12}$, $R_{16}$, and $R_{17}$ are independently selected from the group consisting of haloalkyl groups, aralkyl groups, aryl groups, substituted aryl groups, heteroaryl groups, and substituted heteroaryl groups.

25. The method of claim 23, wherein $R_7$, $R_8$, $R_{11}$, $R_{12}$, $R_{16}$, and $R_{17}$ are independently selected from the group consisting of aryl groups.

26. The method of claim 24, wherein $R_7$, $R_8$, $R_{11}$, $R_{12}$, $R_{16}$, and $R_{17}$ are each phenyl.

* * * * *

UNITED STATES PATENT AND TRADEMARK OFFICE
CERTIFICATE OF CORRECTION

PATENT NO. : 10,246,558 B2
APPLICATION NO. : 15/596681
DATED : April 2, 2019
INVENTOR(S) : Sudhanshu Srivastava et al.

Page 1 of 1

It is certified that error appears in the above-identified patent and that said Letters Patent is hereby corrected as shown below:

In Column 23, Claim 1 and Column 24, Claim 8, the "R12" appearing outside of the brackets in Formula (X) should be "R2."

Signed and Sealed this
Twenty-fourth Day of March, 2020

Andrei Iancu
*Director of the United States Patent and Trademark Office*